(12) United States Patent
Cifers

(10) Patent No.: US 9,863,576 B1
(45) Date of Patent: Jan. 9, 2018

(54) ACCESSORY MOUNTING SYSTEM

(71) Applicant: Luther Cifers, Amelia, VA (US)

(72) Inventor: Luther Cifers, Amelia, VA (US)

( * ) Notice: Subject to any disclaimer, the term of this patent is extended or adjusted under 35 U.S.C. 154(b) by 848 days.

(21) Appl. No.: 13/960,772

(22) Filed: Aug. 6, 2013

Related U.S. Application Data

(63) Continuation-in-part of application No. 13/954,253, filed on Jul. 30, 2013, now Pat. No. 9,671,060.

(60) Provisional application No. 61/677,455, filed on Jul. 30, 2012, provisional application No. 61/680,254, filed on Aug. 6, 2012.

(51) Int. Cl.
*A47B 96/00* (2006.01)
*F16M 13/02* (2006.01)
*F16B 35/06* (2006.01)
*F16B 7/04* (2006.01)

(52) U.S. Cl.
CPC .............. *F16M 13/02* (2013.01); *F16B 7/04* (2013.01); *F16B 35/06* (2013.01); *Y10T 403/7094* (2015.01)

(58) Field of Classification Search
CPC ......... Y10T 403/7094; Y10T 29/49936; Y10T 29/49915; F16B 7/04; F16B 35/06
USPC ............ 248/225.11, 225.21, 225.52, 223.41, 248/224.61, 223.21; 403/252, 253, 254, 403/256, 257, 330, 348, 350; 411/396, 411/397
See application file for complete search history.

(56) References Cited

U.S. PATENT DOCUMENTS

| | | | | |
|---|---|---|---|---|
| 585,475 | A | * 6/1897 | Huber | ............... G09F 1/06 248/225.11 |
| 1,705,086 | A | * 3/1929 | Ferguson | ............ F16B 35/06 411/107 |
| 2,157,309 | A | * 5/1939 | Swedman | ............. A47B 57/50 248/222.52 |
| 2,176,644 | A | * 10/1939 | Sladek | ................. A47K 10/10 248/205.1 |
| 2,269,847 | A | * 1/1942 | Feinson | ............. A47K 5/1204 248/223.41 |
| 2,859,710 | A | * 11/1958 | Elsner | .................... A47B 91/08 248/222.52 |
| 3,208,560 | A | * 9/1965 | Cote | ..................... F16B 37/045 248/59 |
| 3,291,088 | A | 12/1966 | Klose | |
| 3,331,348 | A | 7/1967 | Dyer | |

(Continued)

FOREIGN PATENT DOCUMENTS

| FR | 2606842 A1 | * 5/1988 | ............. A47B 57/46 |
|---|---|---|---|
| JP | 10060755 A | * 3/1998 | |
| JP | 2002180412 A | * 6/2002 | |

OTHER PUBLICATIONS

USPTO, Office Action in related U.S. Appl. No. 13/954,253, filed Jul. 30, 2013, dated Dec. 8, 2015.

(Continued)

*Primary Examiner* — Kimberly Wood
(74) *Attorney, Agent, or Firm* — Thedford I. Hitaffer; Hitaffer & Hitaffer, PLLC

(57) ABSTRACT

An accessory mounting bracket provides a quick and easy removable attachment of various devices. The method of attachment of devices to the accessory mounting bracket may be compatible with the attachment of these devices to tee-slot style track systems, allowing the accessory mounting bracket to be used interchangeably with said track systems.

13 Claims, 4 Drawing Sheets

(56) References Cited

U.S. PATENT DOCUMENTS

| | | | | |
|---|---|---|---|---|
| 4,183,387 A * | 1/1980 | Lenz | ............ | F16B 35/06 411/116 |
| 4,244,501 A * | 1/1981 | Ingram | ............ | B60R 9/045 224/324 |
| 4,835,852 A * | 6/1989 | Asplund | ............ | E04F 11/1804 256/65.16 |
| 5,026,013 A * | 6/1991 | Robbins | ............ | A47K 10/10 248/221.12 |
| 5,244,186 A * | 9/1993 | Chandler | ............ | E04F 11/1812 248/223.41 |
| 5,305,700 A | 4/1994 | Strong et al. | | |
| 5,421,036 A * | 6/1995 | Stevens | ............ | E03D 11/16 285/60 |
| 6,019,543 A * | 2/2000 | Junker | ............ | E01F 9/573 116/63 R |
| 6,238,153 B1 | 5/2001 | Karrer | | |
| 6,398,149 B1 * | 6/2002 | Hines | ............ | A47B 21/06 242/388.6 |
| 7,070,374 B2 * | 7/2006 | Womack | ............ | B61D 45/001 410/104 |
| 7,621,487 B2 * | 11/2009 | Brown | ............ | F16L 3/24 248/65 |
| 8,647,009 B2 * | 2/2014 | Kobayashi | ............ | F24J 2/5205 248/237 |
| 2001/0008600 A1 * | 7/2001 | Fraleigh | ............ | E03D 11/16 411/252 |
| 2005/0269465 A1 * | 12/2005 | Carnevali | ............ | B62J 11/00 248/219.4 |
| 2006/0175595 A1 * | 8/2006 | Carnevali | ............ | E04H 12/2261 256/65.14 |
| 2011/0031370 A1 * | 2/2011 | Carnevali | ............ | B62J 29/00 248/483 |
| 2012/0045276 A1 * | 2/2012 | Carnevali | ............ | F16B 7/20 403/350 |

OTHER PUBLICATIONS

USPTO, Office Action dated Jun. 10, 2016 in related U.S. Appl. No. 13/954,253, filed Jul. 30, 2013.

USPTO, Office Action dated Jul. 7, 2016 in related U.S. Appl. No. 13/954,253, filed Jul. 30, 2013.

* cited by examiner

US 9,863,576 B1

ACCESSORY MOUNTING SYSTEM

CROSS-REFERENCE TO RELATED APPLICATIONS

This application is a continuation in part of U.S. patent application Ser. No. 13/954,253, filed Jul. 30, 2013, which claims the benefit of U.S. Provisional Application No. 61/677,455, filed Jul. 30, 2012, and claims the benefit of U.S. Provisional Application No. 61/680,254, filed Aug. 6, 2012, the disclosures of which are incorporated herein by reference.

BACKGROUND

This invention relates in general to the connection of accessory devices to vehicles or structures, and more particularly, to an accessory mounting system that may be fixed to an environment, providing a secure attachment point for various accessory devices.

Devices such as camera mounts, fishing rod holders, personal electronics cradles, marine depth finders, visibility beacons, and various other implements frequently require quick and easy attachment and removal from structures and vehicles, such as personal watercraft, boats, all terrain vehicles, airplanes, automobiles, military vehicles and other vehicles and structures utilizing such devices.

In addition to these devices, other items associated with various environments are commonly stored and organized as many environments contain a variety of items that need to be stored or organized. Within the scope herein, the term "device" shall refer to any item that may be stored or organized in a given environment, or a bracket designed to support such an item.

In some cases, it may be desirable to alter the deployment configuration of these devices, either by arrangement or position. It may also be desirable to interchangeably attach these devices to fixed mounts and track systems, with the fixed mount providing a rigid, low cost, single point of attachment and the track system providing a range of deployment positions that may be altered during attachment or while being used in the field.

These devices have been attached using a variety of methods, including direct and non-removable attachment to the environment, or removable attachment by means of a variety of mounting systems. While a variety of mounting systems have been utilized in some applications, they are each limited in performance by their respective designs. In most cases these attachment methods are not compatible with track systems. These mounting systems may also be too large to fit in tight spaces, and may not have a low profile design that is desirable in many applications.

There remains a need for an accessory mounting bracket that provides a secure means of removable attachment, is compatible with accessory track systems, utilizes a small footprint and low profile, and is designed for surface mounting.

SUMMARY

The present invention relates to an accessory mounting bracket that provides a quick and easy removable attachment of various devices. The method of attachment of devices to the accessory mounting bracket may be compatible with the attachment of these devices to tee-slot style track systems, allowing the accessory mounting bracket to be used interchangeably with said track systems.

Various advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
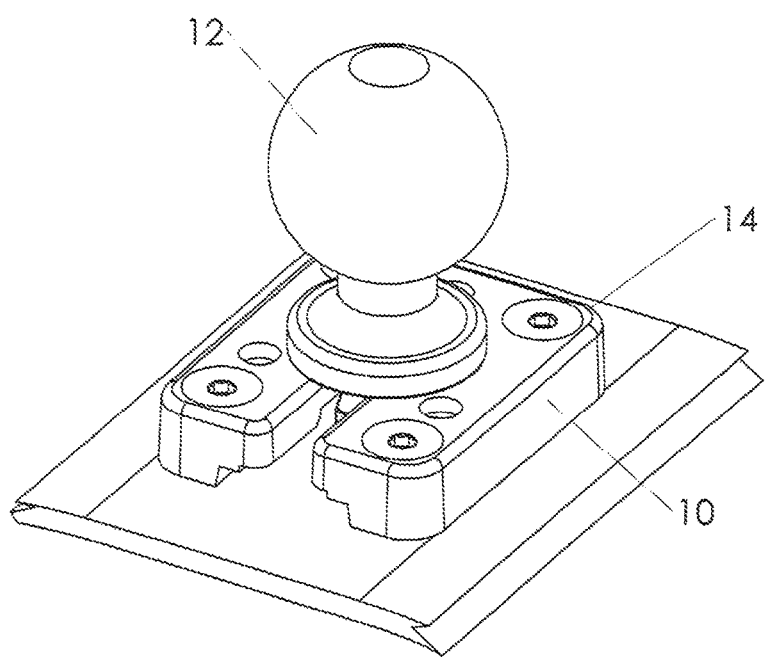
FIG. 1 is a perspective view of an accessory mounting bracket attached to a supporting environmental surface with a device attached to the accessory mounting bracket.

Referring now to the drawings, wherein like numerals designate like components throughout all of the several figures, there is illustrated in FIG. 1 an accessory mounting bracket 10 for removably attaching a device 12 to a supporting environmental surface 14.

Exemplary devices are shown in U.S. patent application Ser. No. 13/897,916, filed May 20, 2013, entitled Monopod Turret Support, and U.S. patent application Ser. No. 13/476,441, filed May 21, 2012, published as US Patent Application Publication No. 2012/0293990, entitled Fold-Up Beacon and Associated Post for Vehicles, the disclosures of which are incorporated herein by reference.

It shall be observed that the device 12 shown is an example (e.g., a ball for a ball and socket mounting system) of a device that may be attached to the accessory mounting bracket 10, but a number of devices of many sizes, shapes, and uses, or brackets designed to clamp or support such devices, could be used instead of or in addition to the device 12. The depiction of the device 12 shall not in any way be construed as a limitation as to the size, shape, or type of device that could be attached to the accessory mounting bracket 10.

The supporting environmental surface 14 may be part of a vehicle, such as a boat or kayak, for example. The supporting environmental surface 14 may alternately be part of a structure, such as a wall in a building or an armrest of a tree stand, for example. It shall be observed that the supporting environmental surface 14 is a graphical representation of an example of such a surface, but that it does not limit in any way the size, shape, or configuration of possible supporting environmental surfaces or the method of attachment to such surfaces.

Figure 2:
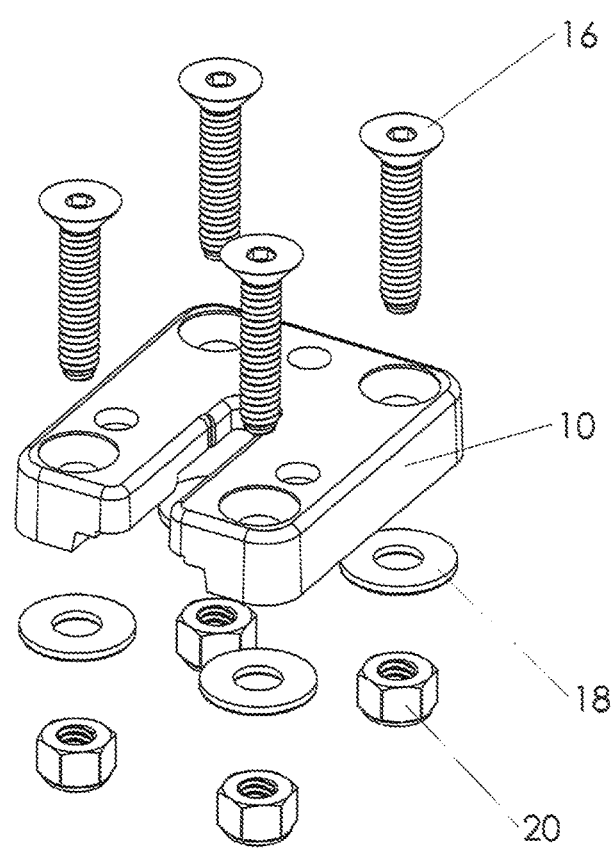
FIG. 2 is an exploded perspective view of an accessory mounting bracket with an example of attachment hardware.
Figure 3:
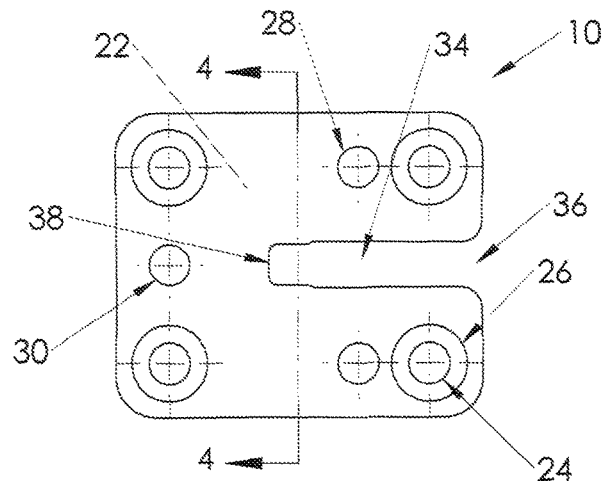
FIG. 3 is a plan view of an accessory mounting bracket.
Figure 4:
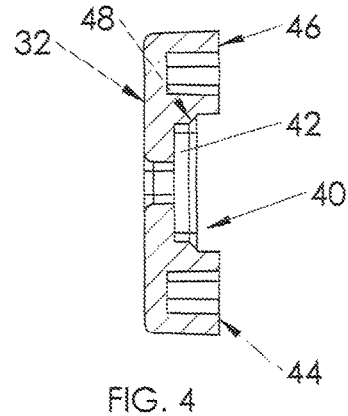
FIG. 4 is a cross sectional view of an accessory mounting bracket taken along the line 4-4 in FIG. 3.
Figure 5:
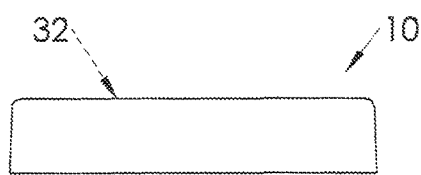
FIG. 5 is a side elevational view of the accessory mounting bracket shown in FIG. 3.
Figure 6:
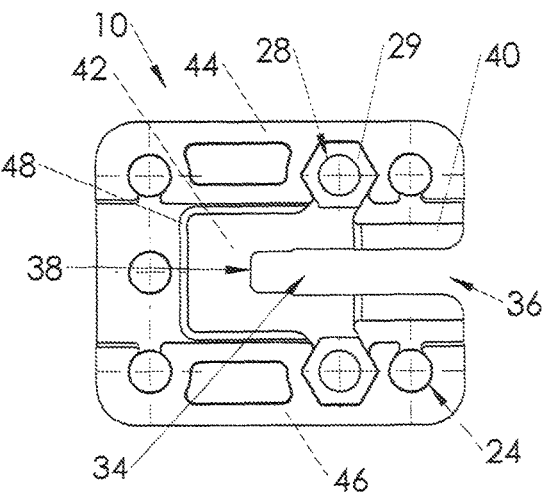
FIG. 6 is a projected bottom view of the accessory mounting bracket shown in FIG. 5.
Figure 7:
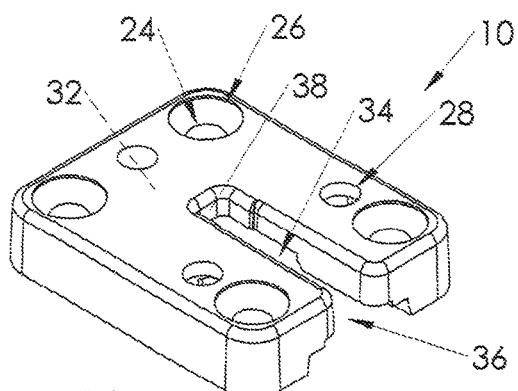
FIG. 7 is a projected perspective view of the top side of the accessory mounting bracket shown in FIG. 5.
Figure 8:
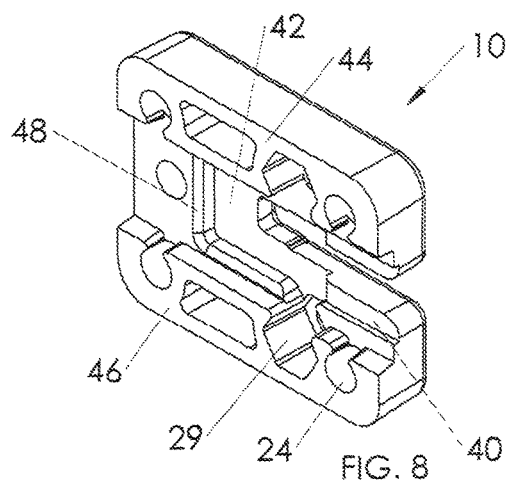
FIG. 8 is a projected perspective view of the bottom side of the accessory mounting bracket shown in FIG. 5.
Figure 9:
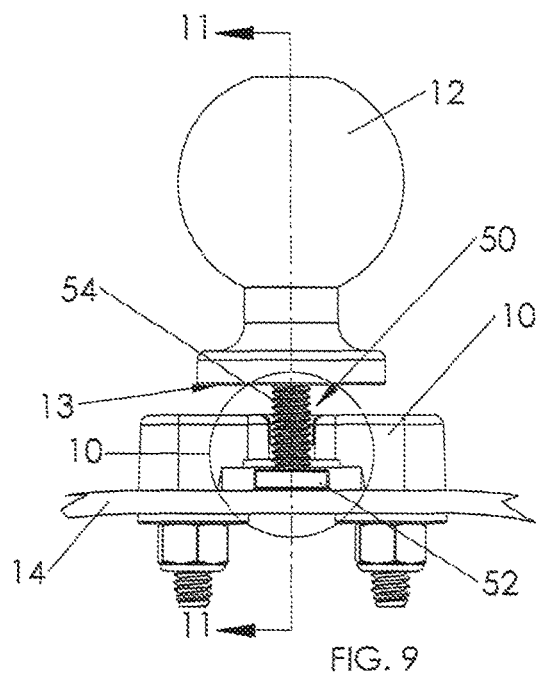
FIG. 9 is a partially exploded front elevational view of the accessory mounting bracket shown in FIG. 1.
Figure 10:
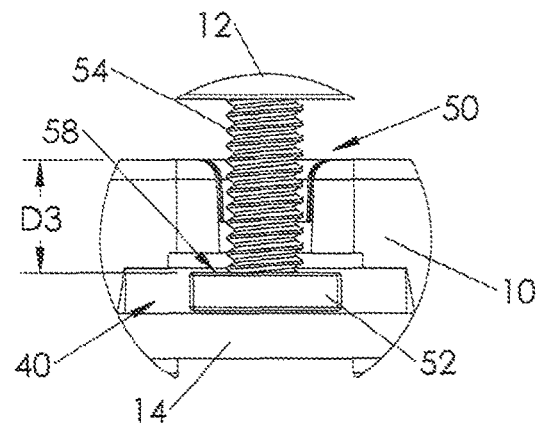
FIG. 10 is an exploded elevational detail view of components partially revealed in FIG. 9.

Referring now to FIG. 2, the accessory mounting bracket 10 may be attached to the environment with one or more mounting screws 16, washers 18, and nuts 20. As previously mentioned, it shall be understood that alternate methods of attachment to the supporting environmental surface 14 may be utilized without limiting the scope of this disclosure.

Looking now at FIGS. 3 through 8, the accessory mounting bracket 10 may comprise a base structure 22 with attachment holes 24. The attachment holes 24 may have a countersink feature 26 or a counter bore feature (not shown).

The accessory mounting bracket 10 may comprise one or more auxiliary device attachment holes 28, a track attachment hole 30, and an open ended slot 34. The auxiliary device attachment holes 28 may have a nut retention pocket 29 (shown in FIG. 6) on the opposite side of the accessory mounting bracket 10. The open ended slot 34 may comprise a slot opening 36 on one end and a slot termination 38 on another end.

The accessory mounting bracket 10 may further comprise a device mounting interface 32, a clearance channel 40 which may terminate at a retention pocket 42, a left lateral support pad 44, and a right lateral support pad 46. The retention pocket 42 may have a chamfer 48 that exists around the perimeter, at the interface between the clearance channel 40 and the retention pocket 42.

It may be mentioned at this point that, for the scope of this entire disclosure, orientation terms, such as "top" and "bottom" or "left" and "right", refer to their subject matter as semantic conveniences only and not as a necessary condition of the accessory mounting bracket 10, as the accessory mounting bracket 10 may obviously be utilized in any desired position or orientation.

Referring now to FIGS. 9 through 12, a device 12 is shown being attached to the accessory mounting bracket 10. There is a tee-bolt 50 comprising a head 52 and a stud 54 threaded into the device 12. The tee-bolt 50 is in the open ended slot 34 (shown in FIG. 3), oriented so that the stud 54 passes through the open ended slot 34 and into the threads in the device 12. In the state shown in FIG. 10, the device 12 is in a position in which it is installed but not tightened. The preferred method of this installation is to insert the stud 54 of the tee-bolt 50 into the slot opening 36 (shown in FIG. 3) until the stud 54 makes contact with the slot termination 38 (also shown in FIG. 3). It should be appreciated that the clearance channel 40 is of sufficient depth to allow the head 52 of the tee-bolt 50 to pass between the supporting environmental surface 14 and the accessory mounting bracket 10.

Once the device 12 is fully inserted into the slot 34, the device may be lifted in a direction perpendicular to and away from the device mounting interface 32, causing the head 52 of the tee-bolt 50 to enter the retention pocket 42, which may be of sufficient width and length to accommodate the head 52 of the tee-bolt 50 closely so that the head 52 of the tee-bolt 50 is unable to turn a full rotation. We can see in FIG. 12 that the retention pocket 42 may serve as a mechanical restraint, restricting rotation of the head 52 of the tee-bolt 50.

Figure 11:
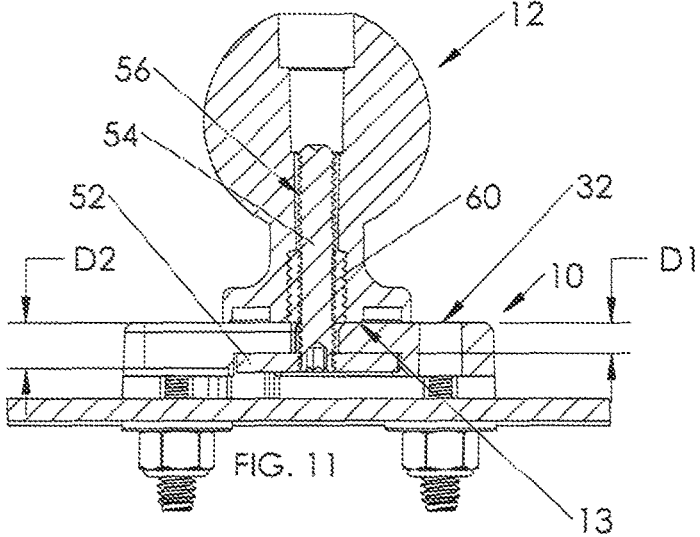
FIG. 11 is a cross sectional view taken along the line 11-11 in FIG. 9, in an unexploded state.
Figure 12:
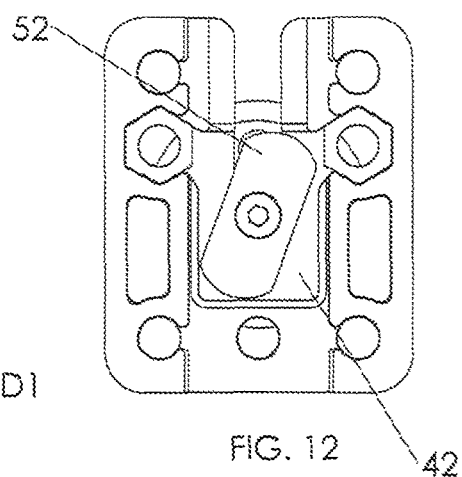
FIG. 12 is a bottom plan view of the accessory mounting bracket shown in FIG. 9.

As shown in FIG. 11, the device 12 may have female threads 60, which are threaded onto the stud 54 of the tee-bolt 50. It should be appreciated that by rotating the device 12, the threads 56 of the stud 54 may interact with the female threads 60, which may urge the device 12 towards or away from the head 52 of the tee-bolt 50, depending on the direction of rotation. When sufficiently rotated, the device 12 may be urged towards the head 52 of the tee-bolt 50 until the mounting surface 13 of the device 12 makes contact with the device mounting interface 32 of the accessory mounting bracket 10 and the head upper surface 58 (shown in FIG. 10) makes contact with the inside of the retention pocket 42 (shown in FIG. 12). When the device 12 is turned further, friction may increase between these surfaces 13, 32 and 42, 58, which may effectively lock the device 12 in position.

By rotating the device 12 in the opposite direction, the friction may be eliminated. However, because the distance D1 (shown in FIG. 11) between the inside of the retention pocket 42 and the device mounting interface 32 is substantially less than the distance D2 (also shown in FIG. 11) between the clearance channel 40 and the device mounting interface 32, removal of the device 12 may not be achieved until the device 12 is continually rotated until the distance between the head upper surface 58 of the head 52 and the mounting surface 13 of the device 12 is greater than the distance D3 (shown in FIG. 10) between the clearance channel 40 and the device mounting interface 32. This additional rotation of the device 12, required for removal of the device 12 from the accessory mounting bracket 10, may provide significant security against accidental removal of the device 12 from the accessory mounting bracket 10 if the device 12 is inadvertently rotated in the direction that urges the tee-bolt 50 away from the device 12.

Figure 13:
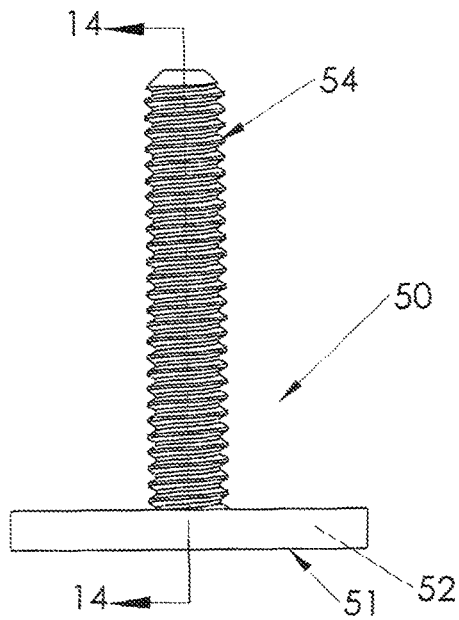
FIG. 13 is an elevational view of a tee-bolt assembly.
Figure 14:
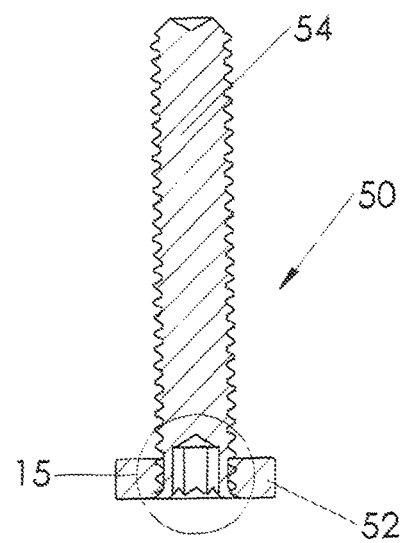
FIG. 14 is a cross sectional view of a tee-bolt assembly taken along the line 14-14 in FIG. 13.
Figure 15:
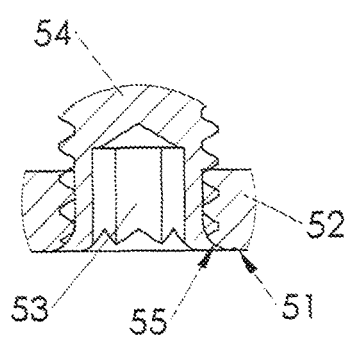
FIG. 15 is an exploded elevational detail view of components partially revealed in FIG. 14.

Looking now to FIGS. 13 through 15, we can see a tee-bolt 50 in its assembled state. The tee-bolt 50 may be an assembly, comprised of a flat metal head 52 and a threaded stud 54. The threaded stud 54 may have a blind hole 53 whose shape may be circular or polygon, or another shape. The blind hole 53 serves as a central point from which a flare 55 may be formed. The flare 55 of the stud 54 interacts with the head 52 of the tee-bolt 50 in a way that substantially inhibits separation of the head 52 and the stud 54. The flare 55 may be formed by inserting a mandrel (not shown), which may be conical or some other shape, into a recessed pocket in the center of the threaded stud 54, with the head 52 adequately supported to maintain its flatness, and applying pressure, which may form the flare 55. Secondary operations may be utilized to create dimples or other features (not shown), which may enhance the mechanical interference between the head 52 and the threaded stud 54.

Figure 16:
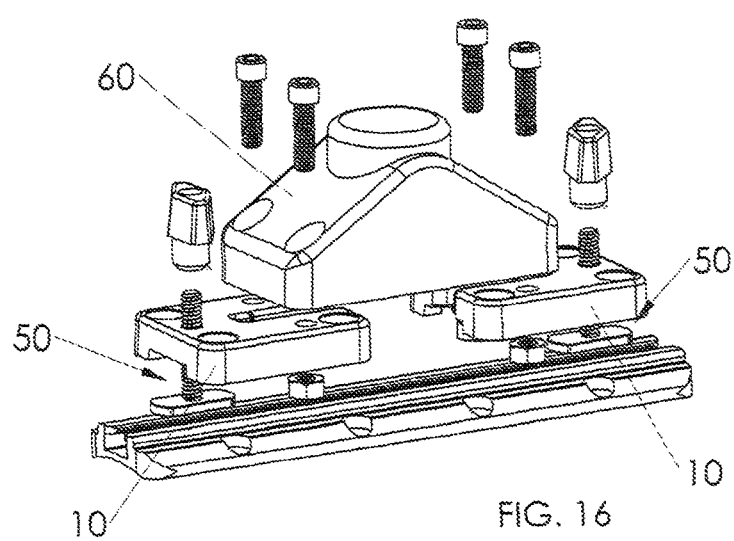
FIG. 16 is an exploded view of an arrangement demonstrating how a pair of accessory mounting brackets can be configured to attach a device to an accessory mounting track.

It should be understood that although a tee-bolt attachment method is depicted in these drawings, other methods of secure and removable attachment of devices to the accessory mounting bracket 10 may also be used. As mentioned, one or more auxiliary device attachment holes 28 may be used to attach a device 12. Looking at FIG. 16, we see how an alternate device 70 may be attached to an accessory mounting track 72 by utilizing two accessory mounting brackets 10 and two tee-bolts 50, which may be inserted into the accessory mounting track 72. The alternate device 70 may be different than what is depicted in these drawings. It should be understood that this is an example of an alternate use of the accessory mounting bracket 10 but other configurations with more or less accessory mounting brackets 10 may be used.

It should be clearly understood that the accessory mounting bracket 10 may comprise any suitable base structure 22 with any suitable number and design of attachment holes 24, a device mounting interface 32, a slot 36, an optional retention pocket 42, and lateral support pads 44, 46. The accessory mounting bracket 10 may also comprise one or more auxiliary attachment holes 28 for alternate attachment methods of various devices.

The accessory mounting bracket 10 composition may be of a substantially strong and lightweight material, such as plastic or aluminum. The material or surface of the accessory mounting bracket 10 may be treated for resistance to harsh environments, such as UV radiation and saltwater exposure.

Attachment of the accessory mounting bracket 10 to the environment may be achieved by putting screws 16 through one or more of the attachment holes 24 and into a receiving feature on the surface on which it is to be mounted. In some configurations, the accessory mounting bracket 10 may be attached to another adapting bracket, such as a rail clamp or accessory mounting track 72, for attachment to the environment.

As mentioned above, the tee-bolt 50 may have a head 52 on one end and threaded stud 54 on another end, and may be attached to the device 12 by screwing the threaded stud 54 of the tee-bolt 50 into the device 12, leaving the head 52 of the tee-bolt 50 extended some distance from the device 12.

Attachment of the device 12 may be achieved by inserting the head 52 of the tee-bolt 50 into the slot 36, and rotating the device 12. The interaction between the threads 56 in the device 12 and the threaded stud 54 of the tee-bolt 50 may urge the head 52 of the tee-bolt 50 towards the device 12, thus causing the head 52 of the tee-bolt 50 to make contact with the underside of the retention pocket 42 and causing the device 12 to make contact with the device mounting interface 32 on the surface of the accessory mounting bracket 10 opposite the retention pocket 42. Further rotation of the device 12 may continually urge the head 52 of the tee-bolt 50 towards the device 12, creating pressure on these areas of contact 13, 32 and 42, 58, the resulting friction of which may be adequate to prevent rotation of the device 12, with reasonable force, in either the tightening or the loosening direction. For removal, the device 12 may be rotated in the opposite direction, which may force the head 52 of the tee-bolt 50 away from the device 12. Initially this may require relatively high force to overcome the friction of the tightened system, but as the device 12 is rotated the friction may dissipate, and ultimately the distance between the tee-bolt 50 and the device 12 may become great enough to remove the device 12 from the accessory mounting bracket 10.

In an alternate configuration, a slot nut and stud configuration (not shown) may be used instead of a tee-bolt. In this configuration, the nut is not permanently attached to the stud as it is in the tee-bolt configuration, but instead has threads which interact with the stud, resulting in the same tightening effect that is achieved with the tee-bolt configuration.

In applications in which excessive rotational forces may be applied to the device 12, an external locking mechanism (not shown) may be used to prevent the device 12 from rotating in the loosening direction.

Another advantage of the accessory mounting bracket 10 is that the retention pocket 42 may captivate the head 52 of the tee-bolt 50 in a way that requires a significant gap between the head 52 of the tee-bolt 50 and the device 12 before the device 12 can be removed. In order to install the device 12 on the accessory mounting bracket 10, the head 52 of the tee-bolt 50 should be some distance from the device 12. That is, the gap between the head 52 of the tee-bolt 50 and the device 12 must be greater than the thickness of the entrance of the slotted region of the accessory mounting bracket 10. Because the retention pocket 42 is recessed some distance from the underside of the accessory mounting bracket 10, the thickness of the accessory mounting bracket 10 is less in that region than in the entrance of the slotted region. As a result, the tee-bolt 50 must be further tightened once the device 12 is fully inserted into the slot 36 in order to eliminate play between the tee-bolt 50, device 12, and the accessory mounting bracket 10. Likewise, when the device 12 is loosened by rotating, it preferably cannot be removed from the accessory mounting bracket 10 until it is further rotated, enough to create a gap which is substantial enough to allow clearance from the thicker slotted region. In this way, the retention pocket 42 may function as a security feature because if the device 12 is accidentally loosened a small amount, the device 12 may not accidentally slip off of the accessory mounting bracket 10.

In an alternate application, the device 12 may be attached to the accessory mounting bracket 10 by fastening it to one or more auxiliary attachment holes 28 that may be present in the accessory mounting bracket 10. In some applications of this configuration, the accessory mounting bracket 10 may serve as an adapting bracket to attach the device 12 to an accessory mounting track 72. The shape of the bottom side of the accessory mounting bracket 10 may cooperate with the shape of the accessory mounting track 72 so that the accessory mounting bracket 10 may maintain its orientation with reference to the orientation of the accessory mounting track 72, but slide along the accessory mounting track 72 when loosened to do so.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An accessory mounting system for attaching a device to a supporting surface, the system comprising:
    at least one accessory mounting bracket comprising:
        base structure,
        one or more attachment holes extending through the base structure for receiving one or more fasteners for attaching the base structure to the supporting surface,
        a device mounting interface atop the base structure for engaging the device when attached to the base structure,
        lateral support pads integral with and beneath the base structure along lateral sides of the base structure for engaging the supporting surface,
        a clearance channel beneath the base structure between the lateral support pads for providing clearance between the base structure and the supporting surface,
        a slot defined by the base structure extending between the device mounting interface and the clearance channel for a tee-bolt for attaching the device to the base structure, and
        a non-tapered retention pocket beneath the base structure on a side opposite of the device mounting interface between the lateral support pads and above the clearance channel for accommodating a head of the tee-bolt, wherein the head of the tee-bolt is not tapered, and wherein
    the head of the tee-bolt comprises a substantially flat metal head and the tee-bolt comprises a threaded stud for threading into the device, the tee-bolt engageable with the slot, oriented so that the threaded stud passes through the slot and the head of the tee-bolt is constrained by the slot, wherein the threaded stud is threaded into the head of the tee-bolt to secure the head of the tee-bolt to the threaded stud.

2. The accessory mounting system of claim 1, further comprising the one or more fasteners, wherein the one or more fasteners are in the form of one or more mounting screws received by the one or more attachment holes for attaching the base structure to the supporting surface.

3. The accessory mounting system of claim 2, further comprising one or more washers and nuts that cooperate with the one or more mounting screws to attach the base structure to the supporting surface.

4. The accessory mounting system of claim 2, wherein the one or more attachment holes each has a countersink or counter bore feature for receiving a head of a corresponding one of the one or more mounting screws, whereby the head of each of the one or more mounting screws is dimensioned and configured to be flush with the device mounting interface.

5. The accessory mounting system of claim 1, wherein the slot is open on one end and has a slot termination on another end adjacent to the retention pocket.

6. The accessory mounting system of claim 5, wherein the threaded stud of the tee-bolt makes contact with the slot termination.

7. The accessory mounting system of claim 1, wherein the retention pocket has a perimeter and a chamfer around the perimeter at an interface between the clearance channel and the retention pocket.

8. The accessory mounting system of claim 1, wherein the clearance channel is of sufficient depth to allow the head of the tee-bolt to pass between the supporting surface and the base structure.

9. The accessory mounting system of claim 1, wherein the retention pocket has a sufficient width and length to accommodate the head of the tee-bolt closely so that the head of the tee-bolt is unable to turn a full rotation so that the retention pocket serves as a mechanical restraint.

10. The accessory mounting system of claim 1, wherein the threaded stud has a blind hole that serves as a central point from which a flare is formed in the stud, the flare of the stud interacting with the head of the tee-bolt in a way that substantially inhibits rotation and separation of the head of the tee-bolt and the stud.

11. The accessory mounting system of claim 1, further comprising the device, wherein the device has female threads that are threaded onto the threaded stud of the tee-bolt, so that by rotating the device, threads of the stud interact with the female threads of the device to urge the device into frictional contact with the device mounting interface of the accessory mounting.

12. The accessory mounting system of claim 1, further comprising one or more auxiliary attachment holes and one or more nut retention pockets beneath the base structure on a side opposite of the device mounting interface and axially with the one or more auxiliary attachment holes.

13. The accessory mounting system of claim 10, wherein the blind hole has a circular or polygon shape.

* * * * *